United States Patent [19]
Reed

[11] 4,332,107
[45] Jun. 1, 1982

[54] WIPER BAR SYSTEM

[76] Inventor: Roger W. Reed, Rte. 5, Hillsboro, Mo. 63050

[21] Appl. No.: 184,125

[22] Filed: Sep. 4, 1980

Related U.S. Application Data

[63] Continuation-in-part of Ser. No. 83,603, Oct. 11, 1979, abandoned.

[51] Int. Cl.³ .............................................. A01M 21/00
[52] U.S. Cl. ..................................................... 47/1.5
[58] Field of Search ........................ 47/1.5; 239/42–46

[56] References Cited

U.S. PATENT DOCUMENTS

| | | | |
|---|---|---|---|
| 2,123,988 | 7/1938 | Corley | 47/1.5 |
| 2,158,115 | 5/1939 | Fullilove | 47/1.5 |
| 2,555,201 | 5/1951 | Nordell | 47/1.5 X |
| 2,653,575 | 9/1953 | Worden | 239/43 X |
| 3,009,290 | 11/1961 | Bratton | 47/1.5 |
| 3,830,067 | 8/1974 | Osborn et al. | 239/145 |
| 4,019,278 | 4/1977 | McKirdy | 47/1.5 |
| 4,027,986 | 6/1977 | Patrick | 47/1.5 |

*Primary Examiner*—James R. Feyrer
*Attorney, Agent, or Firm*—Rogers, Eilers & Howell

[57] ABSTRACT

A direct contact wiper bar and wiper bar system for applying a liquid (such as herbicide) to a stand of vegetation (such as Johnson grass or other weed) includes a wiper bar comprising an elongated tubing with a plurality of holes along its lower portion, a wick made of absorbent material and extending around the lower two-thirds of the tubing and covering the holes, an impermeable plastic shield covering approximately the lower one-half of the tubing and less than all of the wick material, and an outer layer of absorbent material covering the entire assembly. In a first embodiment, the shield is made of a flexible plastic sheeting, or the like, and a length of twine is tightly wound around the length of the shield, wick, and tube to act as the outer covering and also hold the assembly together. In a second embodiment, the shield is made of a rigid plastic pipe cut lengthwise and chamfered at its edges with clamps attaching it to the tube. Burlap is wrapped around the assembly and twine is coiled around the burlap to hold it in place.

16 Claims, 7 Drawing Figures

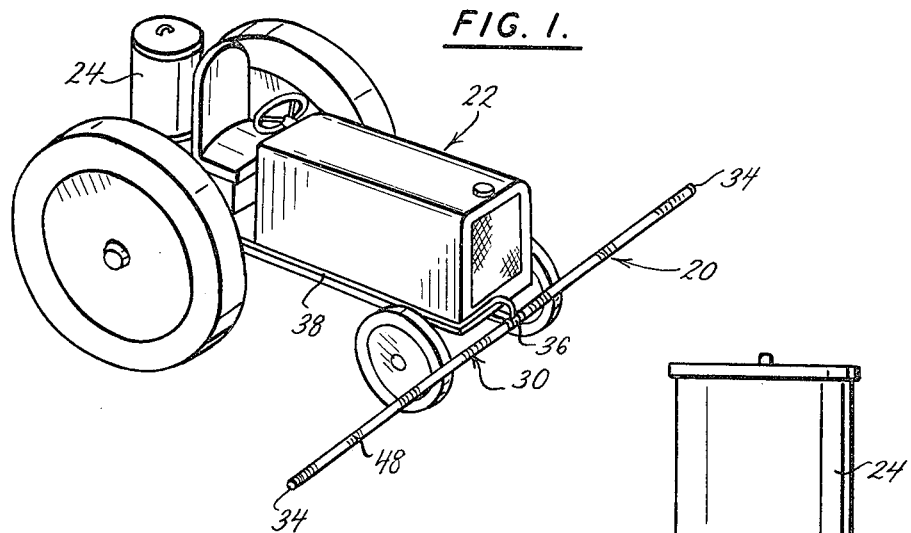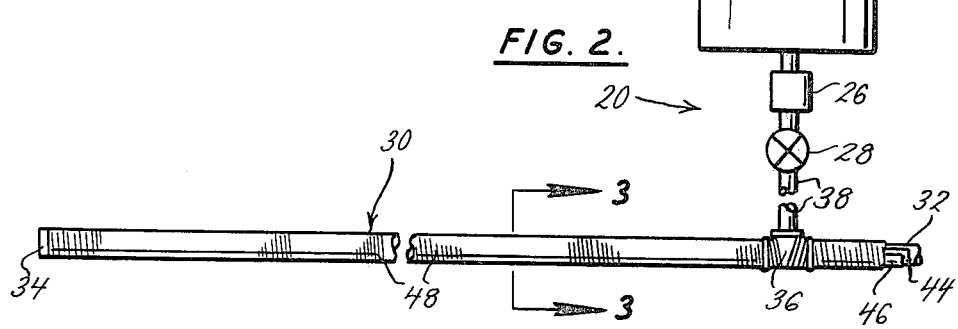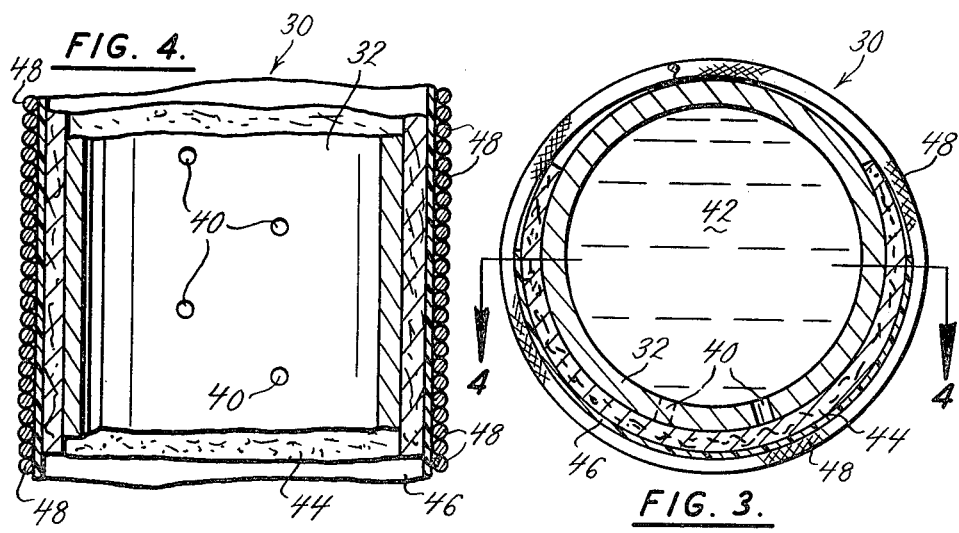

WIPER BAR SYSTEM

This application is a continuation-in-part of application Ser. No. 83,603, filed Oct. 11, 1979, now abandoned.

BACKGROUND AND SUMMARY

To maximize crop yield, it is important to be able to apply herbicides to weeds growing in tilled acreage in an effective way. There are various types of herbicides and devices for applying them, but cost and effectiveness determines the method used for killing particular types of weeds. One of the most effective types of herbicides which can be used is a non-selective herbicide, i.e. non-selective in that it kills whatever vegetation it comes in contact with. Of the various ways of applying non-selective herbicides to a field, one of the most effective is to directly apply the herbicide to the weed by rubbing a saturated applicator across its leaves, especially for grass type weeds. This eliminates losses due to evaporation from spraying, wasted herbicide distributed to other parts of the field, and crop destroyed by misapplied herbicide. Applying a non-selective herbicide to weeds with a saturated wiper is the most effective and least expensive way to kill weeds as maximum use is made of the most effective type of herbicide.

An example of a direct contact applicator using a wiper bar in the prior art is shown in U.S. Pat. No. 4,019,278 which includes two wiper bars adapted to be mounted to a hydraulic positioning assembly at the rear of a tractor. A first type of wiper bar includes a tube with a series of holes which permit the herbicide to leak through the tube and onto a covering of cloth or other wicklike material to provide a larger surface against which the weeds may rub. Alternately, the wiper bar may consist of a porous tubing which permits fluid to seep through the wall of the tube itself to maintain a film on the outer surface thereof. However, these wiper bars do not provide a controlled flow of herbicide and are not effective in transferring the herbicide to the weed.

In the first design, the herbicide has a tendency to saturate the portion of the wick immediately adjacent the hole and leak therethrough onto the ground. As the herbicide is permitted to flow by gravity through the holes and directly onto the wick covering the lower portion of the tube, an effective level of wick saturation can be achieved only for a small arcuate section of the bar. Not only does this limit the maximum flow rate of herbicide, and thereby the speed of a tractor through the field while applying it, it also greatly diminishes the effectiveness of the bar in applying the herbicide to the vegetation.

In the second design wiper bar, insufficient quantities of herbicide flow by osmosis through that portion of the pipe or tubing below the fluid level, and the smooth outer surface of the tube encourages the formation of rivulets of herbicide which trickle off the wiper bar. Thus, neither design provides a wiper bar with a substantial arcuate portion thereof being saturated with herbicide.

Furthermore, there is no means to control the flow of herbicide through either design, although the patentee suggests that the flow may be controlled by a metering valve. If the herbicide is present in the tube, then it will either seep through the holes in the tube or flow by osmosis through the walls of the tube at a rate determined by the physical parameters of the bar, such as the dimensions of the holes and the porosity of the tube wall and only slightly by the level of fluid in the tube. Changing the setting of a metering valve upstream from the tube is ineffective in controlling the flow of herbicide. As there is air in the system which eliminates any hydraulic action, the metering valve must be open wide enough to maintain a sufficient head in the tube to ensure a uniform distribution along the length of the tube. In other words, the metering valve must be open wide enough to meet the flow requirements of the tube design or the tube will run dry. If open too wide, the tube merely fills up and creates a back pressure which limits flow through the valve. Thus, herbicide flow is determined only by the size of the holes or the rate of osmosis inherent in the tube material.

Applicant has succeeded in developing a novel wiper bar and herbicide applicator system which solves the problems of the prior art. Applicant's wiper bar system includes a novel design for a wiper bar having a tube with a series of spaced apart holes along its bottom, a layer of wicklike material surrounding the lower two-thirds of the tube, an impermeable shield surrounding the lower one-half of the tube and wick, and a final layer of absorbent material surrounding the entire assembly. The wick, which may be felt or the like, is saturated by the herbicide as it flows out of the tube and spreads upwardly inside the shield through both hydraulic and capillary action. The impermeable shield which may be made of plastic or the like prevents herbicide from saturating the wick at just the lower end of the tube and dripping onto the field. As the wick covers more of the tube's circumference, it emerges from between the shield and tube on both sides thereof and directly contacts the absorbent outer layer above the mid-point and on both sides of the tube. Thus, the liquid first contacts the outer layer at both the front and rear, and along its upper portion. This is a particularly efficient scheme for saturating the majority of the outer layer and ensuring an even distribution of liquid throughout.

In applicant's first embodiment, a flexible plastic sheet is used as the shield and twine is closely coiled around the shield and tube to form the outer absorbent layer. The twine provides a durable, roughened surface for wiping the vegetation and also provides the necessary strength to hold the assembly together. In a second embodiment, a rigid plastic pipe half with chamfered or tapered edges is used as the shield and is clamped to the tube and wick with stainless steel pipe clamps. In this embodiment, burlap may be wrapped around and form the outer absorbent layer with a loose coil of twine used to hold the burlap in place. The rigid pipe half provides the necessary support for itself and the wick so that the burlap can be easily removed and the wiper bar disassembled for inspection and/or repair in the field.

Applicant's wiper bar design is adapted for hydraulically controlling the flow of herbicide therethrough which represents a significant improvement over the prior art. The wiper bar is filled completely with herbicide and air is bled from the system so that the flow and pressure of herbicide through the wiper bar is controlled by the height of the reservoir with respect to the wiper bar. The higher the reservoir, the greater the pressure and flow of herbicide through the wiper bar. Thus, the flow of herbicide through applicant's wiper bar can be effectively controlled, unlike the prior art.

One or more wiper bars may be mounted on the front end of a tractor and, unlike the prior art, the tractor may be driven forward through the field to apply the herbicide to the weeds. Applicant has found that his system is particularly helpful in eliminating Johnson grass from soybean fields by applying any suitable, non-selective herbicide such as Monsanto's ROUNDUP™. Although applicant discloses this system for use with herbicides and weeds, it is apparent that applicant's system could also be used to apply insecticides, fungicides, or any other liquid directly to any stand of vegetation, either the growing crop, or the undesired weed.

BRIEF DESCRIPTION OF THE DRAWINGS

FIG. 1 is a perspective view of a tractor with applicant's wiper bar system in operating position;

FIG. 2 is a plan view of applicant's system utilizing a first embodiment of a wiper bar;

FIG. 3 is a cross-sectional view taken along the plane of line 3—3 in FIG. 2 and detailing the first embodiment of applicant's wiper bar;

FIG. 4 is a partial cross-sectional view taken along the plane of line 4—4 in FIG. 3 and further detailing the first embodiment of applicant's wiper bar;

DETAILED DESCRIPTION OF THE PREFERRED EMBODIMENT

Figure 5:
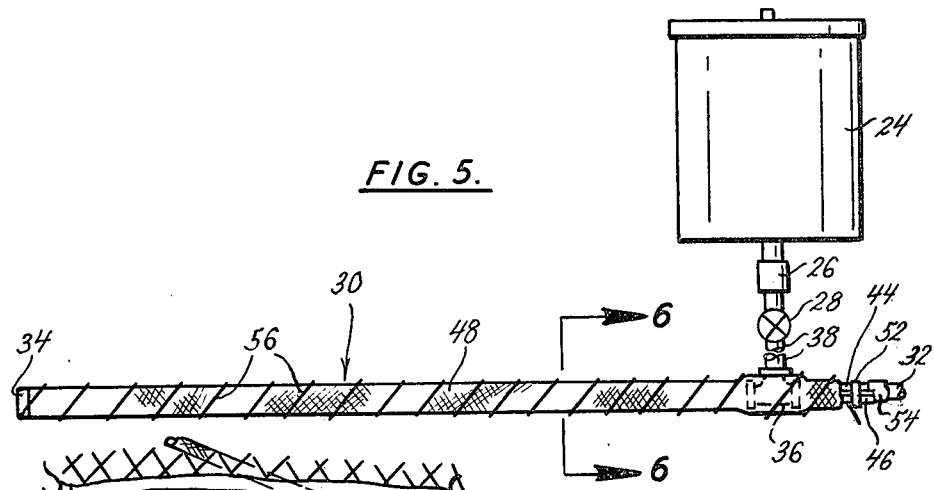
FIG. 5 is a plan view of applicant's system utilizing a second embodiment of a wiper bar.
Figure 7:
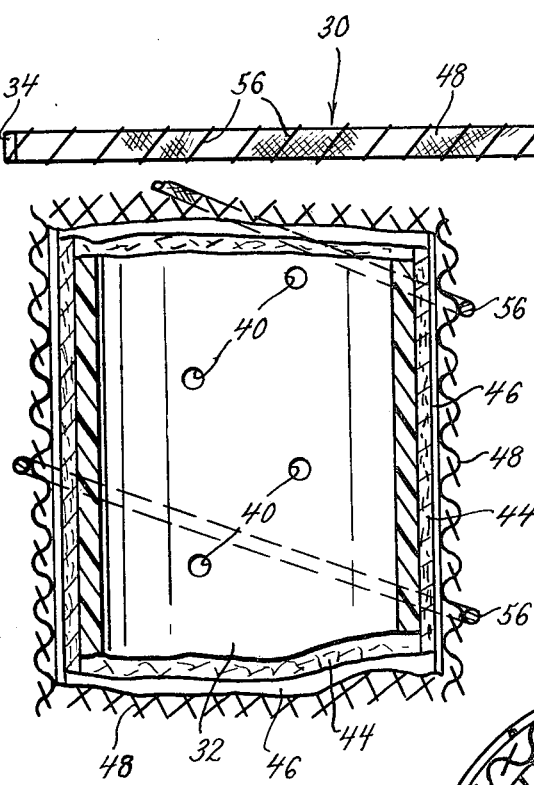
FIG. 7 is a partial cross-sectional view taken along the plane of line 7—7 in FIG. 6 and further detailing the second embodiment of applicant's wiper bar.

Applicant's wiper bar system 20 is shown mounted on the front of a tractor 22 in FIG. 1, as it would be used in applying herbicide or the like to a typical field. The system 20 is shown in more detail in FIG. 2 and includes a reservoir 24, a filter 26, a shutoff valve 28, and at least one wiper bar assembly 30. Wiper bar assemblies 30 of varying lengths and multiple sections may be used, as desired, to sweep through more or less of the field as the tractor 22 traverses the field. Each wiper bar assembly 30 includes a hollow cylindrical length of tube 32 with end plugs 34 at each end thereof. A fitting 36 is provided to couple the supply line 38 to the tube 32 and other fittings may be used as desired, depending upon the number of wiper bar assemblies 30 utilized in the particular system.

Applicant's first embodiment for his wiper bar is shown in more detail in FIGS. 3 and 4, and wherein the tube 32 has a series of holes 40 alternately formed and spaced apart in the lower portion thereof to provide a path for herbicide 42 to exit the tube 32. A wick 44 is wrapped partially around the tube 32 and in both of applicant's preferred embodiments is shown as extending approximately two-thirds around the circumference thereof. The wick 44 absorbs the herbicide 42 and it flows upward to the upper edges of wick 44 through hydraulic pressure and capillary action. An impermeable shield 46 surrounds a good portion of wick 44 and prevents herbicide from saturating the lower portion of wick 44 and leaking directly therethrough. In applicant's first embodiment, shield 46 may be made from flexible plastic sheeting, or the like and wrapped around the wick 44.

An outer layer of absorbent material 48 surrounds the whole wiper bar assembly 30, as shown. In applicant's first embodiment, the absorbent material 48 may be a helically wound coil of bailing twine, rope, or any other suitably roughened absorbent material which is saturable and which is rugged enough to withstand the wiping action of the wiper bar assembly 30 against stands of vegetation including Johnson grass and the like. The tightly wound coil of twine holds the shield 46 and wick 44 in place against tube 32.

Figure 6:
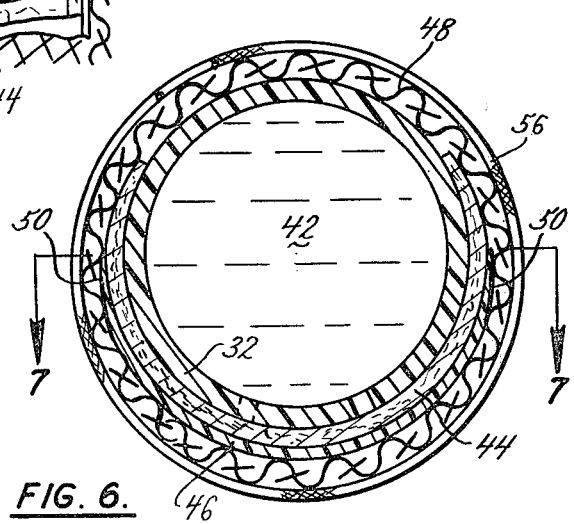
FIG. 6 is a cross-sectional view taken along the plane of line 6—6 in FIG. 5 and detailing the second embodiment of applicant's wiper bar.

Applicant's second embodiment is shown in greater detail in FIGS. 4-6 and is somewhat different from the first embodiment in the construction of the shield 46 and outer cover 48. The shield 46 is constructed of a rigid plastic pipe half which may have chamfered or tapered upper edges 50 to more closely follow the curvature of the underlying tube 32. Several stainless steel pipe clamps 52 secure the ends of shield 46 to the tube 32 and a rubber gasket 54 may be fitted around tube 32 and between shield 46 to thereby seal off the ends of the wick. Thus, shield 46 has sufficient rigidity to be self-supporting along its intermediate length, although additional stainless steel clamps or the like may be used, as desired.

Because the shield 46 is self-supporting, the tightly coiled twine of applicant's first embodiment need not be used and the outer covering 48 may be made of burlap, or the like, itself held in place by a spaced apart coil 56 of twine, wire, or the like. The burlap may be wound only so tightly as required to ensure efficient flow of liquid from the wick 44 and sufficient saturation and distribution of liquid throughout the burlap to accomplish the proper application of liquid to the vegetation by the wiping action.

OPERATION

The operation of applicant's wiper bar system 20 provides the controlled flow and saturation of a wiper bar assembly 30 with sufficient amounts of herbicide 42 to meet varying speeds and densities of vegetation as the tractor sweeps through the field. The system is prepared by first filling the reservoir 24 with herbicide 42, turning on shutoff valve 28, and filling wiper bar assembly 30. To ensure proper operation, any air in the line must be bled from the system and this may be most conveniently accomplished by tilting wiper bar assembly 30 so that its far end is lower than its feed end, and loosening fitting 36 so that as the wiper bar fills with herbicide 42, air is allowed to escape. After the wiper bar assemblies 30 are filled with herbicide 42, hydraulic action is used to control the pressure and flow of herbicide 42 by raising or lowering the reservoir 24 to increase or decrease the head of pressure and thus the flow of herbicide 42 through the system. With applicant's system, the operator can effectively control the flow of herbicide 42 to match the amount of vegetation encountered in particular portions of the field. In addition, he can monitor the operation of the wiper bar system 20 to ensure that the proper amount of herbicide 42 is being applied to ensure killing without dripping or spilling of herbicide 42 onto the crop or field beneath the weeds.

The controlled flow of herbicide 42 through the system is accomplished through use of shield 46 which forces the herbicide through the wick 44 and prevents herbicide 42 from saturating only the lower portions of wick 44 and pouring through to spill on the field and the crop, as in the prior art. As can be seen in FIGS. 3 and 5, only a limited portion of the wick 44 extends from underneath shield 46 and this portion is the only path for herbicide 42 to reach the outer layer of absorbent material 48. Furthermore, as the shield wraps around approximately the entire lower half of the tube 32 and wick 44, the herbicide 42 first contacts the outer layer 48 above the mid-point of the wiper bar 30. As described above, the herbicide 42 is forced through the system by hydraulic pressure and gravity also aids in "filling up" that portion of wick 44 between the tube 32 and shield 46. Thus, herbicide "gushes" out of the wick 44 and on to the outer layer 48 where it quickly and evenly spreads upward through capillary action and downward through both capillary action and gravity. This ensures a very thorough saturation of virtually the entire outer cover 48 with a somewhat greater flow downward from a starting point above the midpoint of the bar 30. This enhances the operation of the system 20.

As the system sweeps through the field, the lower half of the wiper bar assembly 30 applies the majority of the herbicide 42 as the wiper bar 30 contacts the blades of Johnson grass or the like, deflects them downwardly, and, depending upon their resiliency, slides or wipes along their length at a point of contact somewhere between the bottom and front leading edge of the bar 30. Of course, the relative position between the shield 46 and wick 44 affects the distribution of herbicide 42 throughout the outer layer of absorbent material 48. In applicant's preferred embodiment, an equal amount of exposed wick 44 is provided on both sides of the wiper bar assembly 30, thus making the wiper bar assembly 30 suitable for operation in either direction. Different angular locations of the wick 44 and unbalanced wick 44 exposure may be desirable in particular applications.

Changes and modifications to applicant's invention would be apparent to one of ordinary skill in the art. These changes and modifications are included within the teaching of applicant's invention and he intends that the scope of his invention be limited only by the claims appended hereto.

I claim:

1. A wiper bar for applying a liquid to a stand of vegetation in a field, said wiper bar comprising an elongated tube, means for feeding liquid outwardly through a portion of the tube, a wick means wrapped at least partially around the a portion of the tube to receive the liquid fed outwardly through the tube, a shield wrapped at least partially around the lower portion of the wick means and positioned directly outwardly from said wick means so that the wick extends from between the shield and the tube, and an absorbent covering wrapped at least partially around the shield and covering at least a portion of the wick extending from between the shield and tube.

2. A wiper bar for applying a liquid to a stand of vegetation in a field, said wiper bar comprising an elongated tube, said tube having means to meter outwardly therethrough, a wick wrapped at least partially around said tube covering said means to meter to initially receive and become saturated with the liquid as it leaves the tube, a liquid impermeable shield covering at least a part of the lower portion of said wick and outwardly of said means to meter, and an outer absorbent covering surrounding at least the lower portion of the shield and contacting said wick above said shield to receive liquid therefrom so that the shield forces a substantial portion of the liquid to be carried above the shield before contacting the outer absorbent covering to thereby saturate a substantial portion of said absorbent covering.

3. A wiper bar for applying a liquid to a stand of vegetation in a field, said wiper bar comprising an elongated plastic tube, means defining a plurality of holes along the lower portion of the tube, a wick surrounding approximately the lower two thirds of the tube, an impermeable shield made of flexible plastic surrounding the wick and located outwardly of said holes so that said wick is sandwiched therebetween, a portion of the wick extending out above said shield, and an absorbent covering wrapped around the shield, wick and tube, said covering directly contacting that portion of the wick extending from beneath the shield so that liquid flows through the holes in the tube, is absorbed by the wick, migrates up the wick into that portion thereof extending above the shield, and is absorbed by the outer covering to saturate said outer covering.

4. The wiper bar of claim 2 further comprising a reservoir for holding a supply of liquid and a supply line connecting said reservoir to the wiper bar.

5. The wiper bar of claim 4 further comprising means to bleed the air out of the wiper bar so that the flow and pressure of liquid in the tube may be controlled by hydraulic forces.

6. The wiper bar of claim 5 further comprising means wherein the flow and pressure of liquid in the tube may be adjusted by raising or lowering the reservoir.

7. The wiper bar of claim 2 wherein the liquid metering means includes a plurality of holes through the tube and spaced along the lower portion thereof.

8. A wiper bar system including the wiper bar of claims 2 or 3 and further comprising a reservoir for holding a supply of liquid, a supply line communicating between said reservoir and the wiper bar, means to bleed air from the system, and means to control the flow of liquid to the wiper bar so that flow of liquid through the system is controlled by hydraulic forces.

9. The wiper bar of claim 1 further comprising means to bleed air out of the wiper bar as it is filled with liquid.

10. The wiper bar of claim 2 or 1 wherein the shield comprises a flexible plastic sheeting.

11. The wiper bar of claim 2 or 1 wherein the shield comprises a rigid plastic pipe half.

12. The wiper bar of claim 11 wherein said pipe half has chamfered edges.

13. The wiper bar of claim 10 wherein the absorbent covering includes a length of twine closely coiled around said wiper bar.

14. The wiper bar of claim 11 further comprising a plurality of clamps to hold said pipe half in place against the wick and tube.

15. The wiper bar of claim 14 further comprising a gasket between the pipe half and tube and at the ends of said wiper bar to prevent liquid flow out of the ends of the wick.

16. The wiper bar of claim 11 wherein the absorbent covering includes a sheet of burlap with a length of twine coiled around said burlap to hold same in place around the wiper bar.

* * * * *